United States Patent [19]

Andrae et al.

[11] 3,742,589

[45] July 3, 1973

[54] METHOD OF MANUFACTURING SEMICONDUCTOR HIGH-VOLTAGE RECTIFIERS

[75] Inventors: Günter Andrae, Hamburg; Edward Uden, orderstedt, both of Germany

[73] Assignee: U.S. Philips Corporation, New York, N.Y.

[22] Filed: June 9, 1971

[21] Appl. No.: 151,211

[30] Foreign Application Priority Data

June 20, 1970 Germany .................. P 20 30 597.9

[52] U.S. Cl. ........................ 29/577, 29/588, 29/591

[51] Int. Cl. ........................................... B01j 17/00

[58] Field of Search .................. 29/576 S, 577, 628, 29/630 G, 588; 174/3 FP; 317/234, 5.4

[56] References Cited

UNITED STATES PATENTS

| | | | |
|---|---|---|---|
| 3,490,141 | 1/1970 | Lesk | 29/577 |
| 3,391,456 | 7/1968 | Gannoe | 29/625 |
| 3,348,105 | 10/1967 | Doyle | 317/234 |

*Primary Examiner*—Charles W. Lanham
*Assistant Examiner*—W. Tupman
*Attorney*—Frank R. Trifari

[57] ABSTRACT

A method of manufacturing a multiple unit high voltage rectifier assembly in which two metal frames with multiple extending segments are superposed so that respective segments are parallel and spaced apart. One group of segments is provided with transverse portions which overlap the free ends of the other group of segments. The rectifier units are soldered between the confronting faces of the segment ends and the assembly is then embedded in a molding insulating material.

7 Claims, 3 Drawing Figures

Figure 1:
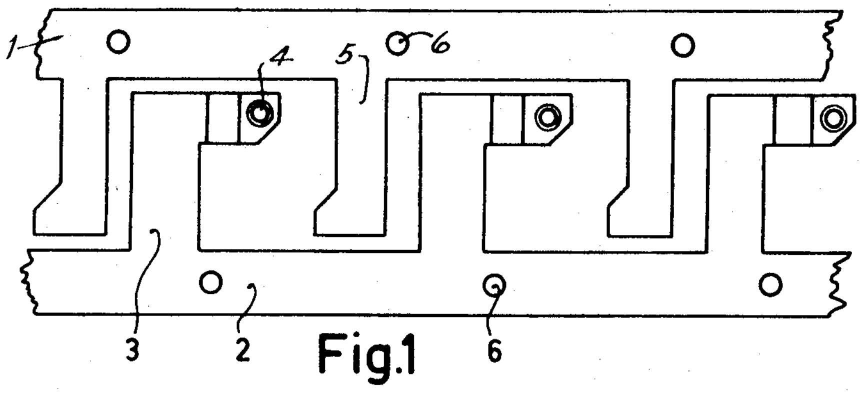

INVENTORS
GUNTER ANDRAE
EDWARD UDEN
BY
AGENT

METHOD OF MANUFACTURING SEMICONDUCTOR HIGH-VOLTAGE RECTIFIERS

The invention relates to a method of manufacturing semiconductor high-voltage rectifiers comprising an arbitrary number of rectifier crystals which are arranged electrically in series and are provided on comb-shaped electrodes.

Actually, for high-voltage rectifiers a high permissible reverse voltage load carrying capacity but a comparatively small forward current load-carrying capacity is required, so that semiconductor devices constructed for a lower power, when connecting an arbitrary number of them in series, could be used for the manufacture of a high-voltage rectifier.

Devices of high-voltage rectifiers are already known in which each time one rectifier crystal is provided on a large number of conductive holders and is connected in series with adjacent holders via a connection wire. This contacting of the individual rectifier crystals by means of a wire is time-consuming as a result of the various operations; the connection of the rectifier crystals by wires moreover has no particularly favourable mechanical properties, and such a wire contacting is quite impossible for devices for which a high current surge load-carrying capacity is required.

The invention is based on the problem of providing a method by which the rectifier crystals necessary for the series arrangement can be secured to the electrodes and be provided with contacts in one operation. According to the invention this problem is solved in that the rectifier crystals are secured between the teeth of two comb-shaped electrodes, the backs of the electrodes are interconnected, and the rectifier crystals are connected in series by a suitable separation of the backs of the interconnected electrodes.

According to a further embodiment of the invention the teeth of the comb-shaped electrodes are shaped differently, the first electrode being bent through 90° and comprising teeth having dish-shaped depressions, the second electrode having teeth the ends of which show a widening; the backs of the combs have circular holes by means of which the electrodes are aligned for connecting purposes and which, since they are provided so that they coincide with each other, simultaneously determine the places where the backs of the interconnected electrodes are separated.

According to a further embodiment of the invention, the soldering process for connecting the rectifier crystals and for connecting the backs of the comb-shaped electrodes is carried out simultaneously in one operation, for which purpose either the rectifier crystals are covered on the upper or lower side of the comb-shaped electrodes are covered with a layer of a soft solder, or soldering foils are laid between the crystals and the comb-shaped electrodes.

The advantages afforded by the invention consist in particular in that as a result of the use of comb-shaped electrodes the contacting of the high-voltage rectifiers is simplified, the thermal energy is better dissipated and, as a result of the simultaneous performance of operations (the simultaneous soldering of the rectifier crystals and the soldering of the backs of the combs) the manufacturing process can be considerably simplified, the series arrangement being obtained in a simple manner by cutting the backs of the combs.

A further advantage of the method according to the invention is that the reject percentage of individual rectifiers can be restricted by a simple bridging or replacement in the total system.

Figure 2:
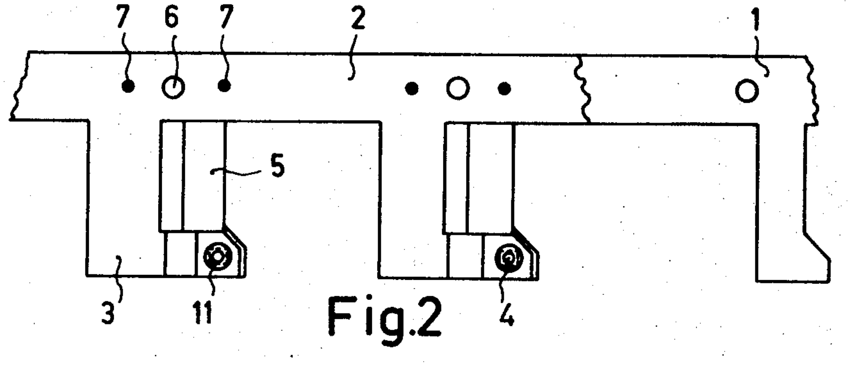
Figure 3:
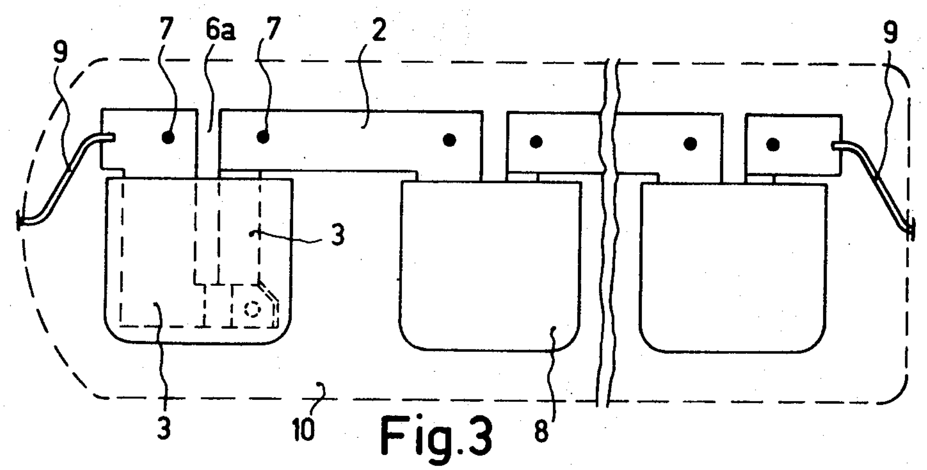

An embodiment of the invention is shown in the accompanying drawing and will be described in detail with reference to the FIGS. below, in which:

FIG. 1 shows the comb-shaped electrodes used in the method according to the invention, FIG. 2 shows two comb-shaped electrodes which are welded and soldered together and have rectifier crystals soldered between the teeth of the electrodes, FIG. 3 shows the finished semiconductor high-voltage rectifier.

FIG. 1 shows two coherent comb-shaped electrodes 1 and 2 which have been punched or etched from a bronze strip for a large number of such electrodes. The electrodes 1 and 2 are silver-plated, the teeth 3 of the electrode 2 are bent through 90° and are provided with a dish-shaped depression 4. Beside the teeth 3 of the electrode 2 and the teeth 5 of the electrode 1, circular holes 6 are present in the back of the comb which serve for the alignment of the comb and mark the places where the combs have to be cut afterwards.

The rectifier crystals 11 are laid in the dish-shaped depressions 4, the backs 1 and 2 of the combs are laid on each other in such manner that the crystals 11 are clamped between the teeth 3 and 5 of the combs 2 and 1. The combs are aligned relative to each other in such manner that the circular holes 6 coincide with each other, the backs are then welded together at the points 7 and the whole system is finally soldered in a transit furnace. FIG. 2 shows the two combs 1 and 2 which are rigidly connected together.

FIG. 3 shows the teeth 3 and 5 of the combs 2 and 1 which are embedded in an insulating material 8; at the area of the circular apertures 6 the backs of the combs are separated. The separations obtained in this manner are denoted by 6a. The two ends of the system are provided with connection wires 9. The entire system is finally embedded for the second time in insulating material 10.

We claim:

1. A method of manufacturing an assembly comprising a plurality of semiconductor rectifier elements connected electrically in series, comprising the steps of providing a first electrically conductive member having a longitudinal frame portion and a first group of support segments extending from said frame portion in parallel, providing a second electrically conductive member having a longitudinal frame portion and a second group of support segments extending from said second frame in parallel, one of said groups having transverse portions extending from the free end of the segments thereof, superposing said first and second frame members with the segments thereof extending in the same direction and spaced from each other and with the transverse extensions of said one group of segments overlapping the free ends of the segments of the other of said groups, electrically securing rectifier elements between the respective overlapping extensions and free ends, bonding the said frame members together at points along the length thereof, and transversely dividing said bonded frame members at regions thereof confronting between each pair of segments supporting a semiconductor element.

2. A method as claimed in claim 1 wherein the segments of said first group have transverse portions extending at a right angle to the length of the segment and the transverse portion has a dish-shaped depression and further comprising the step of positioning said rectifier elements in said dish-shaped depressions.

3. A method as claimed in claim 1 wherein said frame portions are provided with aligning indicia and further comprising the step of superposing said first and second frame members with the respective indicia thereof in alignment.

4. A method as claimed in claim 1 wherein said rectifier elements are soldered between the said respective overlapping extensions.

5. A method as claimed in claim 4 wherein soldering said rectifier elements between the said respective overlapping extensions comprises the steps of interposing solder foils between each side of the rectifier element and the confronting surface of the segment and heating said segment ends to a temperature fusing said foils.

6. A method as claimed in claim 1 comprising the step of welding said frame portions together.

7. A method as claimed in claim 1 further comprising the step of embedding said segment ends and attached rectifier elements in individual moldings of insulating material and thereafter embedding the assembly in an insulating material.

* * * * *